US006533191B1

(12) United States Patent
Berger et al.

(10) Patent No.: US 6,533,191 B1
(45) Date of Patent: Mar. 18, 2003

(54) WATER PROJECTION DEVICE, SYSTEM, AND METHOD FOR PROJECTING WATER

(75) Inventors: David C Berger, New Braunfels, TX (US); Jeffery W. Henry, New Braunfels, TX (US)

(73) Assignee: New Braunfels General Corporation, New Braunfels, TX (US)

( * ) Notice: Subject to any disclaimer, the term of this patent is extended or adjusted under 35 U.S.C. 154(b) by 0 days.

(21) Appl. No.: 09/206,638

(22) Filed: Dec. 7, 1998

(Under 37 CFR 1.47)

(51) Int. Cl.[7] ......................... B05B 17/08; B05B 17/04; G03B 9/20

(52) U.S. Cl. ............................. 239/22; 239/12; 239/16; 239/17

(58) Field of Search .............................. 239/12, 16, 17, 239/18, 19, 20, 21, 22, 1, 461, 463, 472, 494, 497; 472/117, 128

(56) References Cited

U.S. PATENT DOCUMENTS 2,888,205 A 5/1959 Trucco
4,205,785 A 6/1980 Stanley
5,022,588 A 6/1991 Haase
5,069,387 A 12/1991 Alba
5,194,048 A 3/1993 Briggs
5,224,652 A 7/1993 Kessler

*Primary Examiner*—Michael Mar
*Assistant Examiner*—Davis Hwu
(74) *Attorney, Agent, or Firm*—Meyertons, Hood, Kivlin, Kowert & Goetzel, P.C.; Eric B. Meyertons

(57) ABSTRACT

Amusement devices including a water cannon are described, that include a reservoir member and a channel member disposed therein. A water cannon may also include a partition, or plunger member that partitions the interior of the reservoir and slides along the channel member. A water cannon includes an inlet to fill the reservoir with fluid. When full, a gas inlet, connected to a control mechanism and controlled by an operator releases a burst of gas such as air into the reservoir, thus driving the plunger member down the channel member through the interior of the reservoir and forcing a spurt or projectile of water out of the channel. A musical water fountain system may include a water cannon. The musical water fountain system may include a sound system for playing music, a water cannon system for producing projectiles of water and a lighting system for producing visual effects.

23 Claims, 10 Drawing Sheets

WATER PROJECTION DEVICE, SYSTEM, AND METHOD FOR PROJECTING WATER

BACKGROUND OF THE INVENTION

1. Field of the Invention

The present invention is in the field of amusement devices, and in particular devices found in water theme parks.

2. Description of the Related Art

Water recreation facilities have become a popular form of entertainment in the past few decades. Conventional water attractions at amusement parks typically involve using gravity to make water rides work, or they involve spraying water to create a fountain. The water rides that use gravity typically involve water flowing from a high elevation to a low elevation along a water ride surface. These gravity induced rides are generally costly to construct, and they usually have a relatively short ride time. Conventional fountains in water parks are generally passive attractions for people because guests of the parks usually cannot control the water flow in these fountains.

One water attraction that allows guests to become more actively involved with water spraying objects is described fully in U.S. Pat. No. 5,194,048 to Briggs. This attraction relates to an endoskeletal or exoskeletal participatory water play structure whereupon participants can manipulate valves to cause controllable changes in water effects that issue from various water forming devices. Such structures typically rely on the use of pressurized water to produce the various water effects. Manipulation of the valves allows the pressurized water to escape through nozzles which are positioned about the participatory water play structure.

SUMMARY OF THE INVENTION

Disclosed herein are amusement devices that include a water projection device. Such amusement devices are referred to herein as "water cannons". A water cannon may be a device that projects a stream of water, and, as used herein, is preferably a device that propels a mass of water in a single spurt. Unlike many devices which rely on the use of pressurized water, the water cannon disclosed herein may use a burst of gas to expel the water from the water cannon.

The devices disclosed herein include a reservoir for the water or fluid to be propelled. In some embodiments, the reservoir is elongated, and may be cylindrically shaped to resemble the shape of the barrel of a cannon or large gun. Other shapes may also be used, including, but not limited to a circle, a star, a square, a rectangle, a regular polyhedron, a trapezoid, an ellipse or a figure eight, when seen in a cross-sectional view. The reservoir is also described herein as a first hollow member. In certain embodiments, the reservoir may include a section of pipe with a closed end, and having an end with an opening through which another member may extend.

The second member, which is also a hollow member, may also be contemplated to be a pipe in certain embodiments, with both ends open. The second hollow member, may also be of any of the shapes as described above for the first member, but is smaller in diameter than the first member, so that the second member can, at least partially, fit inside the first member during use. It is understood that the first and second members may be of the same basic shape, as elongated cylinders, or they may be different shapes. The second member may also include a channel. The channel preferably fits in the opening in an end of the first member and forms an airtight seal in the opening. During use, when the second member is assembled with the first member, one end of the second member is contained within the first member and the other end is external to the first member. Preferably, the second member extends through at least the majority of the length of the hollow interior of the first member. Any length of the second member inside the reservoir will be effective as long as the second open end is in the fluid when the reservoir is filled. Because it is understood that the cannon will most often be "fired" in at least a slightly raised direction, the channel may curve or turn downward in order to place the open end under the surface of the fluid. This curve or angled turn may be accomplished by bending or angling a channel of a single piece, or by adding an extension to a straight channel. An elbow, curve, or other connector may be used to join two or more pieces of the channel. Any of the pieces may be flexible, or rigid.

A water cannon preferably includes a plunger member, or a partition member that fits inside the reservoir and provides a partition that covers the cross-sectional profile of the reservoir. As such, if the reservoir is cylindrical, then the plunger will be generally circular or disc-shaped to conform to the shape of the reservoir. The plunger member also has an opening of a size and shape to accommodate the channel member so that the plunger is easily slidable along the channel member, thus forming a slidable partition that covers substantially the entire area from the channel member to the walls of the reservoir. The plunger may include some holes or openings to allow some air and water to pass through in order to make it more aerodynamically and hydrodynamically effective. These openings are in addition to the opening that contains the second hollow member or channel member.

A water cannon as described herein also includes one or more fluid inlets effective to release fluid into the reservoir during use. A fluid inlet may include a connector such as a female adapter for a hose, and/or it may include a valve. A valve in the fluid inlet may be controlled by an operator or a valve may be controlled by a device such as a float that automatically turns off the flow when the fluid level in the reservoir reaches a desired level. Such valves are known in the art, and any suitable type of valve or cut-off may be used with the present invention. In certain embodiments, a continuous stream of fluid or water may be connected to the inlet so that the reservoir is continuously filled and re-filled. The fluid inlet, during use, may be connected to a fluid source, such as a water source that may include a hose or pipe and a pump for moving the fluid into the reservoir.

A water cannon as described herein preferably includes one or more gas inlets effective to release a gas such as air into the reservoir during use. It is the release of gas that "fires" the cannon. When a burst of gas is released into the reservoir, the plunger is driven down the channel member, forcing the fluid in the reservoir into the channel member and firing out the other end of the channel in one large spurt. In this way, a water cannon as described herein is distinguished from amusement devices that shoot a continuous stream of water under pressure. The devices as described herein are more accurately described as lobbing a "shell" of water or other fluid. In order to achieve this effect, the plunger member is disposed between a gas inlet and the second open end of the channel member during use so that the influx of gas tends to force the plunger member toward the open end of the channel member in the rear of the reservoir. It is understood that the front of the device is the portion from which the fluid is rejected, and the rear is the opposite end. It should be understood that the water ejected in this manner is substantially unpressurized. Since the external opening of the channel member is substantially unrestricted, the water is free to move through the channel in response to the movement of the plunger member. The faster the movement of the plunger member, the higher the velocity at which the water is ejected. This differs from conventional water projecting devices which tend to eject pressurized water streams.

A gas inlet as used in a water cannon is in communication with a control mechanism. The control mechanism is activated during use by the operator of the water cannon. The control mechanism may be any of a variety of mechanisms known in the art, and would include, but not be limited to an electronic switch, a manual switch, a lever, a handle, a wheel, a pedal, a pressure pad, a button, foot operated switch, or a trigger. In certain embodiments, the control mechanism may include a foot pedal that is pressed by the foot of an operator to "fire" the cannon. The gas inlet may be connected, during use, to a source of pressurized gas, and most typically the gas inlet is connected to a source of compressed air. The cannon may also include a "sight" either mounted or attached on top of the cannon, or possible attached to a side of the reservoir member. A sight may be configured similarly to a rifle sight with front and rear sights, or it may be circular with a cross hair arrangement, for example.

A water cannon as described herein may also include an air release valve. This valve may be configured to release air from the first hollow member. The air release valve is useful as the reservoir is filling with fluid, to allow air to escape. The air release valve may be no more than an opening that remains above the fluid level while the reservoir is filling. Such an opening may also serve as an indication to an operator that the reservoir is sufficiently filled, when fluid is leaking from the opening. In other embodiments, an air release valve is configured such that the air release valve is open when the first hollow member is empty of fluid, and the air release valve is closed when the fluid reaches a predetermined level in the first hollow member during use. Such a valve may include a float as is known in the art.

It is understood that the channel member is smaller in diameter than the reservoir member so that the channel fits inside the reservoir and leaves room for the fluid. The relative size of the two members also determines the amount and velocity of the fluid ejected upon firing. The inventors have found that a preferred size relationship is that the diameter of the channel member is about one-third the diameter of the reservoir member. Other size relationships are also useful and would include, but are not limited to, a size relationship such as a channel member with a diameter of from about one-fifth to about three-fifths, or from about one-quarter to about two fifths, the diameter of the reservoir. Any such size relationship would fall within the scope of the claims as long as the cannon is effective to expel a liquid burst upon release of the gas or air. For example, a device designed for very young children would be configured to propel the water with less force, and a larger channel member could be used.

Any of the amusement devices described herein may include a support apparatus, or a stand. The stand, or holder may include a base and some form of upright member that connects the base to the reservoir. The base may be no more than an attachment to the ground, or it may be a platform, or even a rotatable platform. In certain embodiments, a water cannon is configured to swivel from side to side so that it may be aimed by an operator. A cannon may also, in certain embodiments be swiveled in a vertical direction to be aimed in a higher or lower direction. In certain embodiments, the support apparatus may also provide a seat for an operator, or a platform for an operator to stand on. Any mechanism for swiveling, or raising and lowering a cannon may be used. The upright member may swivel with respect to the base, or the reservoir member may swivel with respect to the upright member. The entire apparatus may also rock so that the cannon may be raised or lowered. In certain embodiments, the reservoir may tilt up or down with respect to the upright member. In certain embodiments, the support apparatus may include a semispherical ball and cup connection such that swiveling from side to side, and raising and lowering of the cannon may be accomplished simultaneously.

An embodiment of the present disclosure is also an amusement park including a an amusement device as described herein, particularly a water cannon. An embodiment of the disclosure is also a method of operating an amusement device as described herein. The method may include providing a water cannon. A water cannon provided may include a first hollow member including a closed end and an opposite end having an opening therein; a second hollow member including first and second opposing open ends, wherein the second hollow member is of smaller diameter than the first hollow member, and wherein, during use, the second hollow member is disposed in the opening in the first hollow member to form an airtight seal within the opening, such that the first open end is preferably outside or coplanar with the first hollow member and the second open end is inside the first hollow member; a partition member with an opening therein to accommodate the channel in a slidable engagement therein, wherein, during use, the partition member is disposed inside the first hollow member and the second hollow member is disposed in the opening in the partition member, such that the partition member is slidable along at least of portion of the second hollow member, and further wherein the partition member substantially forms a partition from the exterior surface of the second hollow member to the interior surface of the first hollow member; one or more fluid inlets connected to a fluid source and effective to release fluid into the first hollow member during use; one or more gas inlets connected to a source of pressurized gas, and effective to release a gas into the first hollow member during use, and wherein the partition member is disposed between a gas inlet and the closed end of the first hollow member during use; and a control mechanism in communication with a gas inlet. A method of use would include opening the fluid inlet effective to substantially fill the first hollow member with fluid and activating the control mechanism effective to release a burst of gas into the first hollow member, thereby ejecting a spurt of water from the first opening in the second hollow member.

An aspect of the disclosure provided herein is also a method of manufacturing a water cannon including: providing a first hollow member including a closed end and an opposite end having an opening therein; providing a second hollow member including first and second opposing open ends, wherein the second hollow member is of smaller diameter than the first hollow member, and wherein, during use, the second hollow member is disposed in the opening in the first hollow member to form an airtight seal within the opening, such that the first open end is outside the first hollow member and the second open end is inside the first hollow member; providing a partition member with an opening therein, wherein, during use, the partition member is disposed inside the first hollow member and the second hollow member is disposed in the opening in the partition member, such that the partition member is slidable along at least of portion of the second hollow member, and further wherein the partition member substantially forms a partition from the exterior surface of the second hollow member to the interior surface of the first hollow member; providing one or more fluid inlets effective to release fluid into the first hollow member during use; providing one or more gas inlets effective to release a gas into the first hollow member during use, and wherein the partition member is disposed between a gas inlet and the closed end of the first hollow member during use; and providing a control mechanism in communication with a gas inlet.

In another embodiment, a musical water fountain system is provided that is a participatory water play system. In an embodiment, the musical water fountain system includes a sound system for playing one or more musical notes, a water cannon system for producing projectiles of water, a light system for displaying lights, and a plurality of activation points for activating the sound system, the water cannon system, and/or the light system.

The act of applying a participant signal to the activation points preferably causes one or more of the following: a sequence of music notes is produced, a projectile of water is produced from one or more water cannons, and lights are activated. A participant signal may be applied by the application of pressure, a gesture (e.g., waving a hand in front of a motion sensor), or voice activation. The activation points are configured to respond to the applied participant signal. The activation points are preferably coupled to a control system. The activation points may be located on instruments. The activation points preferably sense the participant signal applied by the participant(s) and send a first signal to the sound system, a second signal to the water cannon system, and/or a third signal to the light system. The sound system may respond by playing a musical note. The water cannon system may respond by producing a projectile of water. The light system may respond by turning on lights within a light display located near the fountain system.

The musical water fountain system preferably provides participants with a visual, audio, or tactile indication at a predetermined time to alert the participants to apply a participant signal to a specific activation point. A conductor may be used to provide the indication to the participants. The conductor may be an individual who motions to selected participants at predetermined times. The conductor may also be an image projected on a screen that is visible by the participants. Alternately, an electrical indication may be provided to the participants. For instance, a light, sound, or tactile signal may be activated to indicate the participants to apply a participant signal to the activation points.

In an alternate embodiment, the instruments may produce the musical notes and the sound system may enhance the musical notes by increasing their volume and/or by synthesizing musical sounds or sound effects. Instruments which may be included in the water fountain system include, but are not limited to, keyboard instruments (e.g., a piano), percussion instruments (e.g., a drum set), brass instruments (e.g., a trumpet), guitars (e.g., an electric guitar), string instruments (e.g., a violin), woodwind instruments (e.g., a saxophone), and electronically generated sounds (whistles, animal noises, etc.). The instruments of the water fountain system are preferably played via applying a participant signal to an activation point located on or in the vicinity of the instrument. For example, the activation points of a piano may be on the keys of the piano, and the activation points of a drum set may be located on top of each drum. In one embodiment, the instruments may be large enough to hold participants. The instrument may be played by standing on a pressure sensitive activation point.

In one embodiment, a musical fountain may include a group of different instruments. Each of the instruments may be activated by applying a participant signal to an activation point. A conductor may be used to indicate the activation of the instruments or of specific notes of the instruments. A group of participants may respond to the conductor's signals such that a musical tune is produced. By cooperatively participating with the fountain the participants may create sounds and visual effects which are pleasant to both the participants and spectators.

In another embodiment, an "orchestra" of fountains may be used to produce a musical tune. A series of fountains may be arranged about a centrally positioned conductor. The conductor may indicate to the participants to activate their musical fountain at predetermined times. The cooperative effort of the participants may create a musical tune by playing each of the individual fountains at the appropriate times.

Although any methods and materials similar or equivalent to those described herein can be used in the practice or testing of the present invention, the preferred methods and materials are now described.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
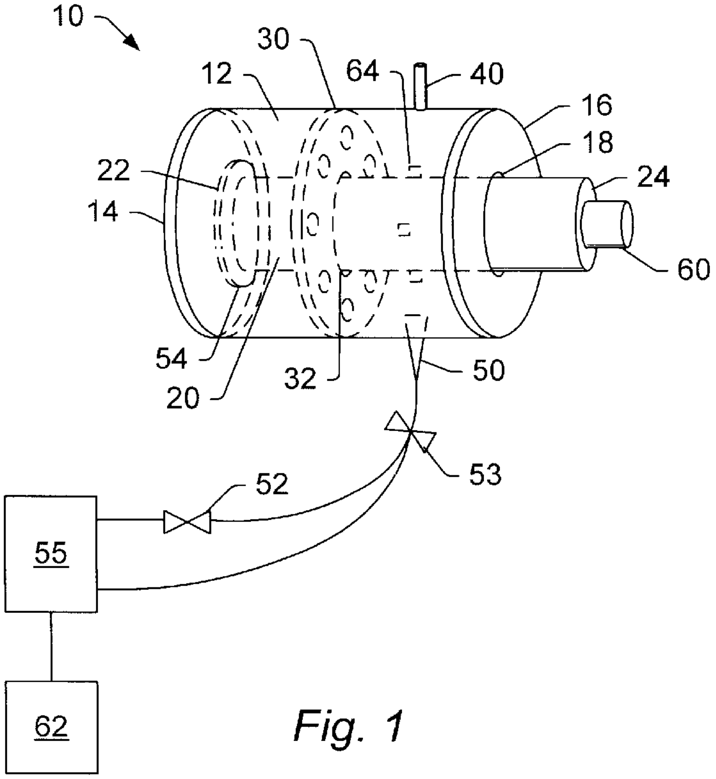
FIG. 1 is a side view of an embodiment of a water cannon.

Turning to FIG. 1, a perspective view of an embodiment of a water cannon 10 is shown. The water cannon may include a first hollow member or reservoir 12, having a closed end 14 and an opposing end 16. The opposing end 16 provides an opening 18 through which a second hollow member or channel 20 may be disposed. The second hollow member preferably has opposing open ends 22 and 24, such that, during use, open end 22 it disposed inside the first hollow member 12, and open end 24 is disposed outside of first hollow member 12. Open end 24 may, in certain embodiments include a hollow projection or nose 60, in open communication with the second open end 22, such that a fluid flowing into the second open end 22 would flow out the projection or nose 60. Alternatively, the open end 24 may include a flat end with an opening therein. The opening in open end 24 may be the same size as and contiguous with the hollow interior channel of hollow member 20, or the opening may be narrower, or larger. It is also understood that a narrowing structure may project into the hollow member 22. In certain embodiments an opening in the second hollow member 20 may be at least partially covered by a screen.

When member 20 is disposed within the opening 18, preferably an air-tight and water-tight seal is formed between member 20 and member 12 at the opening 18. The members may be rigidly and/or permanently scaled, as with a weld or other permanent joint, or they may be sealed with the use of a gasket and/or sealant such as silicone or glue.

The embodiment of a water cannon 10 may further include a planar or disc shaped member, the partition member 30. The partition member 30 provides an opening 32 such that the second hollow member 20 is able to fit within the opening 32 and the partition member 30 is freely slidable along the second hollow member 20. The device may also include a stop 54 attached to the second hollow member 20, near open end 22, to prevent the partition member 30 from sliding off the second hollow member 20 during use. The stop 54 may be a separate piece attached to the second hollow member 20, or to the first hollow member 12, or it may be a ridge, bump, projection or a series of projections formed into the first hollow member 12 or second hollow member 20 that is effective to prevent the partition member 30 from sliding off the second hollow member 20 during use. In certain embodiments, the stop 54 may be attached to or formed as a combination of attachments to, or projections in, the first and second hollow members 12, 20. In certain embodiments, in which open end 22 is positioned so close to end 14 that a partition member 30 is too large to slip off second hollow member 30, a stop is not needed. In addition, in those embodiments in which a gas inlet 50 is attached to end 16, a stop 64 is not needed.

The first hollow member 12 may also include one or more inlets 40 for a liquid such as water. An inlet 40 may further include a valve (not shown) to control the flow of water or other fluid into the first hollow member 12. The valve may be passively operational such that the valve automatically closes when the fluid level in the reservoir reaches a certain level, and the valve opens when the fluid level falls below that level. The valve may also be operated by an operator of the water cannon, or may be operated by a timer or other means known in the art. The inlet 40 is preferably in fluid communication with a fluid source, such as a water source, and the source may, in certain embodiments include a pump for moving fluid from the source into the inlet.

The reservoir 12 may also include one or more gas inlets 50 disposed during use between the end 16 of the reservoir 12 and the partition member 30. The gas inlets 50 are, in certain embodiments, connected to a control mechanism or switch 52, which may be connected to a source of compressed gas or compressed air. Switch 52 may be opened and closed to cause the reservoir 12 to become filled with gas. During use, opening the switch 52 may allow gas to flow into the chamber, causing an increase in gas pressure to be produced within the chamber. This increase in gas pressure preferably causes the partition 30 to move causing the ejection of a projectile of water. After the projectile has been ejected, switch 52 may be closed to inhibit flow of gas into reservoir 12.

In an embodiment, a second switch 53 may be positioned between switch 52 and gas inlet 50. Second switch 53 may be an air-operated actuator. Second switch is preferably configured to allow the air pressure to build up between switch 52 and 53 such that the air is pressurized to an appropriate pressure. To produce a burst of gas, switch 53 is preferably opened allowing the pressurized gas to escape. After an appropriate burst of gas is ejected, the valve is closed and the air pressure allowed to increase. In this manner, the air line supplies air for only the time required to provide the burst of water. Switch 52 will serve as a main cutoff switch. During use, switch 52 will remain open to allow flow of air to reservoir 12. Switch 52 may be closed to prevent the water cannon from being used, e.g., during routine maintenance. The use of a dual switch system allows gas from the gas supply system to be conserved and energy use of the device to be reduced.

Switch 52 and/or switch 53 may be connected to a control system 55. The control system may be configured to accept remote signals from an activation point 62. An activation point is a device which generates a control signal in response to a participant signal. Examples of activation points include, but are not limited to an electronic switch, a manual switch, a lever, a handle, a wheel, a pressure pad, a button, a trigger, a motion detector, and a microphone. Switches 52 and/or 53 may be coupled to an activation point 62 via the control system 55 such that a participant signal delivered to activation point 62 causes a control signal to be sent to control system 55. Control system 55, upon receiving a signal from activation point 62, sends a switching signal to the switches 52/53 such that the switches are opened. Opening of the switches causes a sequence of events which ultimately produces a water projectile. Signals sent between activation point 62 and control system 55, as well as between the control system 55 and the switches 52/53 nay be either electrical or pneumatic signals. Activation points and participant signals are described in more detail below, The activation points may be located on or in the vicinity of the water cannon. Alternatively, the activation points may be located at a remote location from the water cannon. By placing the activation points at a remote location, a participant may operate one or more water cannons which are located in an inaccessible location, e.g., the top of a play structure or building.

Alternatively, control system 55 may be configured to operate the switches 52/53 without any participant input. The control system may be programmed to produce water projectiles at random or predetermined intervals. Based on the programming of the control system 55, the control system will send signals to switches 52/53 to initiate the production of a water projectile. The control system may be configured to continuously operate the water cannon. Alternatively, the control system may be configured to operate the water cannon system when the activation points are in an idle state, e.g., when no participants are present.

During operation of the water cannon, fluid is allowed to flow in the fluid inlet 40 and to at least partially fill the reservoir or first hollow member 12. It is preferred that the fluid fill the reservoir 12 at least until the fluid level completely covers open end 22. As fluid reaches the proper level, a valve in the fluid inlet 40 may closed or the fluid flow may be stopped by some other means. When the reservoir 12 is full of fluid, the partition member 30 is disposed near open end 24, and may rest against one or more stops 64. This may be described as the "loaded" cannon configuration. When the cannon is in the loaded configuration, an operator may activate the switch 52 to release compressed gas or air into an air inlet 50. The compressed or pressurized gas forces the partition member 30 to slide down the second hollow member 20, forcing the liquid into the open end 22, through the second hollow member 20 and out open end 24. Preferably the water cannon is configured such that the diameter of the second hollow member 20 is no more than about one-third the diameter of the first hollow member 12. This configuration allows an explosive movement of the partition member 30 upon activation of the switch 52 and results in a mass of water being forcefully ejected in a single spurt from the second hollow member 20.

Figure 2A:
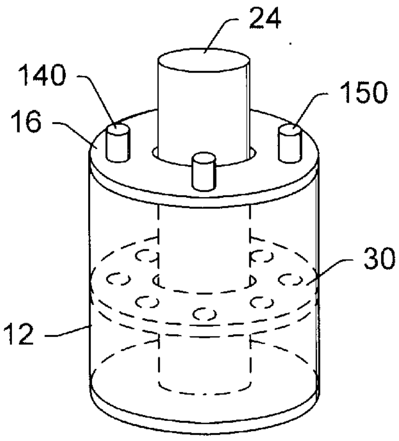
FIG. 2A is a perspective view of an embodiment of a water cannon in a loaded configuration.
Figure 2B:
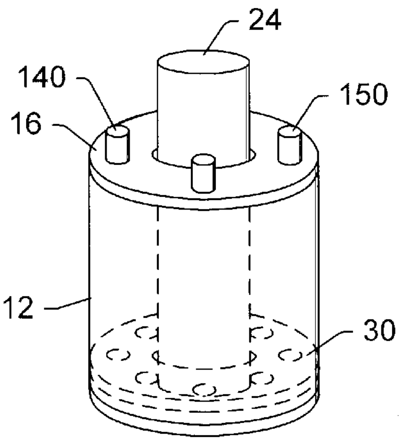
FIG. 2B is a perspective view of an embodiment of a water cannon in a spent configuration.

FIG. 2A is a perspective view of an embodiment of a first hollow member 12 in a loaded configuration. The partition member 30 is disposed at least partially up the second hollow member 20. In the embodiment shown, the end 16 of the first hollow member 12 includes an adapter 140 connected to a fluid inlet 40 and an adapter 150 connected to a gas inlet 50. FIG. 2B is a perspective view of the embodiment shown in FIG. 2A in the "spent" configuration, i.e. after firing. In FIG. 2B, partition member 30 has been forced down the second hollow member 20 by an influx of air and has caused ejection of a fluid "projectile."

By "projectile" is meant a discrete volume or mass of water ejected from a water cannon due to a single release of gas into the first hollow member. Preferably a projectile travels through its trajectory as a discrete, or substantially solid mass of water. It is understood that the projectile will break into smaller portions during the course of its trajectory. Nevertheless, the projectile provides a sudden, large impact of short duration when it hits its target, rather than a continuous stream of water, as in previous water gun type devices. A device as described herein, therefore, provides a different, and more fun sensation for a "target" person who is hit with the projectile as compared to a continuous stream. The present devices provide the target or recipient with a sensation more akin to being hit with a water balloon or a bucket of water, rather than with a stream of water such as results from being sprayed with a water gun or water hose. The projectile may have a volume of between about 8 oz. to about 60 gallons, preferably between 1 gallon to about 20 gallons, and more preferably still between 2 gallons and 10 gallons depending on the size of the water cannon.

By adjusting the pressure of the gas burst, the shape of the projectile may also be varied. For example, a high pressure, short burst of gas may cause a more diffuse projectile, while a low pressure, longer burst of gas may cause a more dense projectile. The type of projectile produced may be determined by the gas pressure, the flow rate of the gas, and the dimensions of the first and second hollow members.

Figure 3:
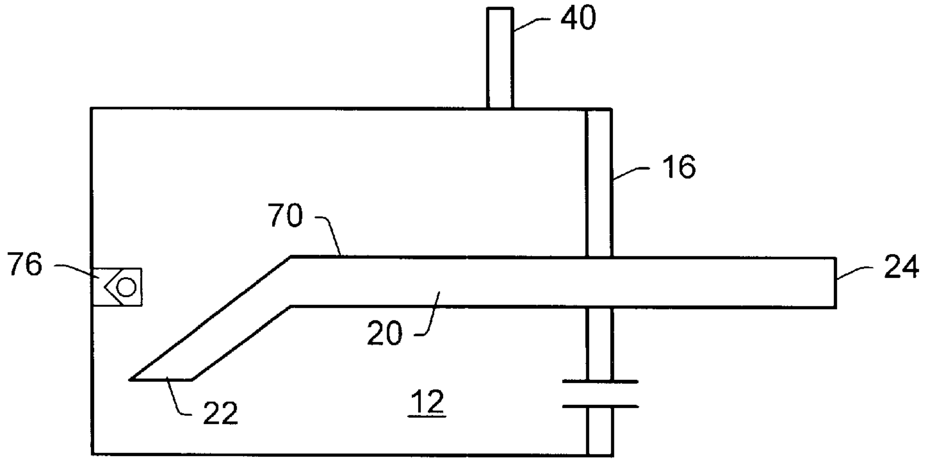
FIG. 3 is a side view of an embodiment of a water cannon.

FIG. 3 depicts an embodiment of a water cannon 10 in which the second hollow member includes a bend or angle 70. Although the device shown in FIG. 3 includes a channel member that forms an obtuse angle, a channel member forming a bend or curve, or a larger or smaller obtuse angle, or even a right angle or an acute angle would be encompassed by the present embodiment. It is contemplated that in order to place the open end 22 further beneath the surface level of a fluid contained in the reservoir 12, it is advantageous to point the second open end 22 of the second hollow member 20 in a downward direction relative to the first open end 24. In this embodiment, the second hollow member 20 is configured such that, during use, when the first open end 24 of the second hollow member 20 is pointed parallel to the ground, the second open end 22 of the second hollow member 20 is positioned below a plane parallel to the ground that intersects the first open end.

Figure 4:
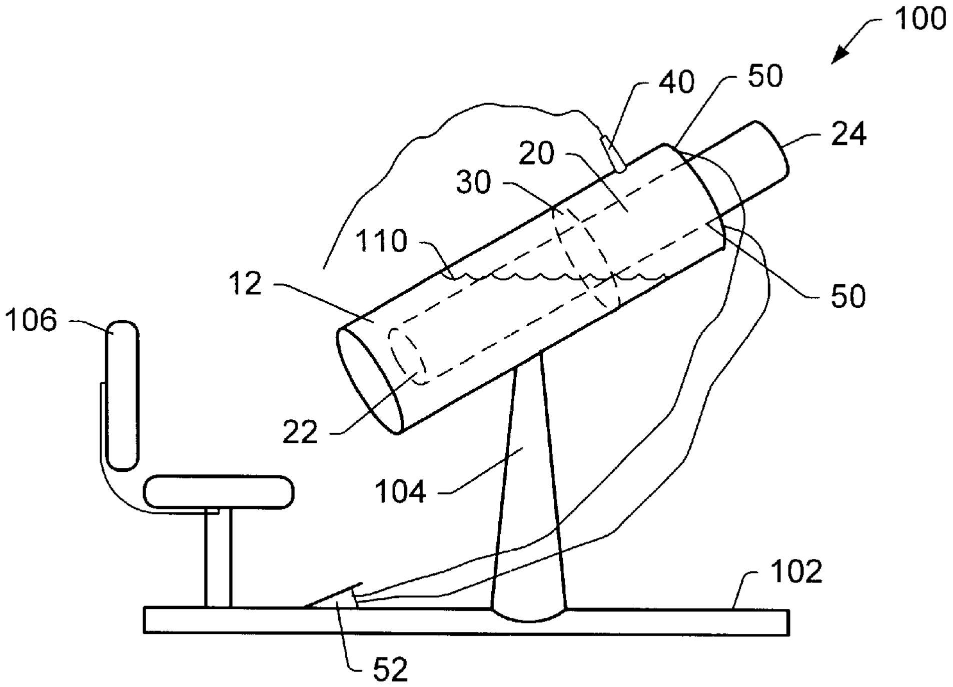
FIG. 4 is a side view of a water cannon that includes a support apparatus.

Turning to FIG. 4, a mounted water cannon 100 is shown. The mounting configuration includes a base 102 that may be attached to or resting on the ground, or in a pool of water, for example. An upright member 104 extends from the stand 102 to the first hollow member 12 and supports the water cannon. A seat 106 is provided for an operator to occupy while operating the water cannon 100. The upright member 104 may be rotatably attached to the base 102 so that the cannon can be swiveled from side to side. In certain embodiments the upright member includes a semispherical attachment that mates with a cup-like structure in the base 102 such that the cannon may be raised or lowered and swiveled simultaneously. In alternate embodiments, the top of the upright member includes a vertically adjustable connection to the first hollow member effective to raise or lower the cannon during use. In certain embodiments, the upper connection of the upright member to the first hollow member is a semispherical ball and cup connection as described above.

As shown in the figure, an activation point 120 may be coupled to the water cannon. The activation point may be a foot pedal positioned for easy access by an operator seated in seat 106. In other embodiments, the activation point 120 may be an electronic switch, a manual switch, a lever, a handle, a wheel, a pressure pad, a button, or a trigger, for example. The switch may be operated by a participant, or may be automatically operated by a control unit. The water cannon may further include a sight, typically positioned on an upper or side surface of the first hollow member in order to more closely resemble a cannon. The device is contemplated to be most effective at projecting a "blob" or mass of water or other fluid when the device is tilted such that the end 24 is pointed at a somewhat upward angle as shown. As is seen in the drawing, the fluid level 110 is above the second open end 22 in the loaded configuration.

Any of the devices described herein may be used in combination to form an array of water cannons in various configurations. For example, two or more water cannons may be set up as opposing sides, such that the operators of one set of cannons may fire at the operators of an opposing set and vice verse. In certain embodiments, the water cannons of opposing sides may fire water or other fluid of different colors so that non-adjacent cannons can be designated or recognized as being on a side. In other embodiments, a single water cannon may include multiple barrels or multiple cannons operated by a single operator or even a single control mechanism so that an operator may achieve a rapid fire effect. Alternatively, the water cannon may be configured to produce multiple projectiles of water. When the control mechanism is switched by an operator, the water cannon may produce multiple water projectiles, either one after another or all at once. When the multiple projectiles are produced one after another, the water cannon may continue producing water projectiles until the control mechanism is no longer switched on.

Figure 5:
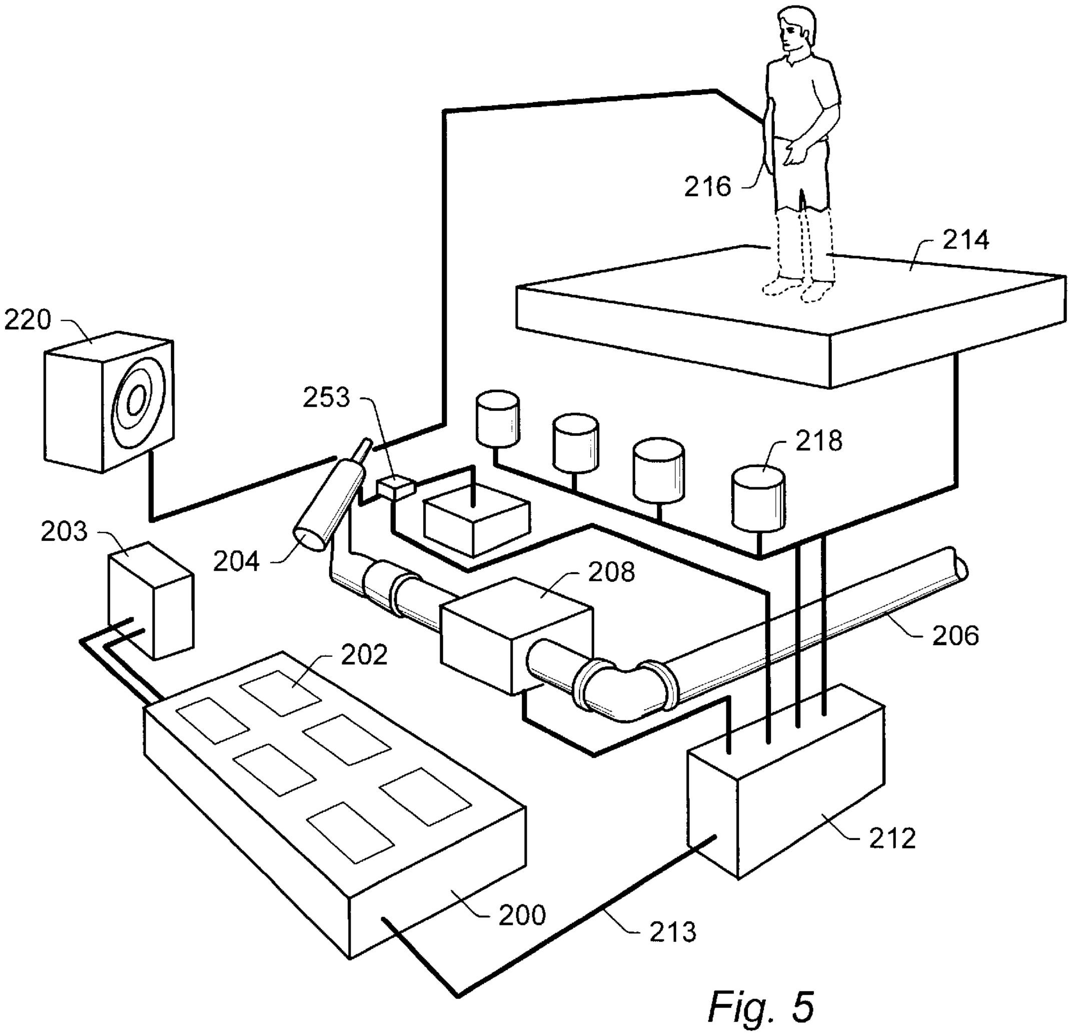
FIG. 5 is a perspective plan view of one embodiment of a musical water fountain system having a sound system.

In an other embodiment, a water canon system which includes one or more water cannons, may be incorporated into a musical water fountain system. An embodiment of a musical water fountain system is depicted in FIG. 5. The musical water fountain system preferably includes a sound system 203 for playing musical notes, a water cannon 204 for producing projectiles of water, and a lighting system adapted to activate lights 218. The sound system, water cannon system, and lighting system are preferably activated by a participant such that the timing of the visual, water and sound effects created by such systems are dependent upon physical acts of the participant.

The musical water fountain system preferably includes at least one instrument 200 included in an "orchestra". In an embodiment, participants apply a participant signal to activation points 202 to activate the instruments. The participant signal may be applied by the application of pressure, moving a movable activating device, a gesture (e.g., waving a hand), or by voice activation. The activation point is preferably configured to respond to the participant signal. In one embodiment, the activation point may be configured to respond to a participant's touching of the activation point. The activation point may respond to varying amounts of pressure, from a very light touch to a strong application of pressure. Alternatively, the activation point may include a button which is depressed by the participant to signal the activation point. In another embodiment, the activation point may include a movable activation device. For example, the activation point may be a lever or a rotatable wheel. The participant may then signal the activation point by moving the lever (e.g., reciprocating the lever) or rotating the wheel. In another embodiment, the activation point may respond to a gesture. For example, the activation point may be a motion detector. The participant may then signal the activation point by creating movement within a detection area of the motion detector. The movement may be created by passing an object (e.g., an elongated member) or a body part (e.g., waving a hand) in front of the motion detector. In another embodiment, the activation point may be sound activated. The participant may signal the sound activated activation point by creating a sound. For example, by speaking, shouting or singing into a sound sensitive activation point (e.g., a microphone) the activation point may become activated.

The activation points 202 are preferably located on or in the vicinity of the instrument 200. Each instrument 200 may contain a plurality of activation points 202. For example, the instrument may be a piano or a keyboard containing a plurality of keys wherein each of the keys contains an activation point 202 (see FIG. 6). Each of the activation points 202 is preferably configured to cause sound system 203 to play a different sound. In an embodiment, the fountain is adapted to create musical notes. Sound system 203 may be used to increase the volume of and/or alter the sound quality of the musical notes created by the instrument. Sound system 203 may include a speaker to increase the volume of the musical note being played. Alternately, the musical notes may be pre-recorded and generated by sound system 203, while the instruments may serve to contain the activation points without actually playing the musical notes. Alternatively, the sound system may make sound effects. For example, the sound system may produce a whistle sound, animal sound, horn sound, etc. In another embodiment, sound system 203 may be a mechanical device configured to produce sounds or musical notes when activation points 202 are signaled.

In one embodiment, each of activation points 202 is preferably configured to sense a participant signal and generate one or more signals in response to the participant's signal. The signals generated by the activation point may be electronic or pneumatic. Each of the activation points is preferably electrically coupled to a control system 212. Control system 212 may be a pneumatic or an electrically operated system. Control system 212 is preferably an electronic control system configured to route the signals from the activation points to the sound system, lighting system, and/or water cannon system. For instance, each time a participant's signal is applied to an activation point, a first signal is preferably relayed to a sound system 203 via control system 212. The first signal preferably indicates to sound system 203 a particular musical note to play, depending on the activation point from which it originated.

Furthermore, when a participant signals an activation point, a second signal may be relayed to a water cannon 204 via control system 212. In response to the second signal, the water cannon 204 may produce a water projectile. The control system may be coupled to switch 253 of a water cannon or multiple water cannons (See FIG. 1). The second signal may cause the switch to open, releasing the pressurized gas into the chamber and causing the production of a water projectile. If more than one cannon is present, then specific cannons may be activated when certain activation points are signaled. Water cannon 204 preferably includes at least one conduit 206, at least one valve 208 disposed within conduit 206 and a gas supply system 211, the conduit and the gas supply system being coupled to water cannon 204. Conduit 206 may be made from materials such as PVC or galvanized steel. The water valve 208 and switch 253 are preferably electrically coupled to control system 212. The second signal may be relayed to switch 253 to signal it to open, thereby causing a burst of gas to be directed into the cannon, causing the water cannon 204 to emit a water projectile.

In an embodiment, a lighting system 218 is located near fountain system 204. When a participant signals an activation point a third signal may be generated by control system 212. The third signal may be relayed to a lighting system 218, thereby activating selected lights of the lighting system.

It is to be understood that the first, second, and third signals described herein may each be taken to mean a single signal or may represent a series of signals. For instance, an activation point may generate a signal and send it to control system 212. In response control system 212 may transmit a signal to the sound system to produce a musical note. For simplicity, the "first signal" may be taken to include the signal generated by the activation point and the signal relayed by the control system.

Each of the activation points may be configured to generate the first, second, and third signals each time a participant's signal having a predetermined magnitude is sensed by the activation point. For pressure activated points, the signals may be generated in response to a predetermined amount of force applied to the activation point. For motion activated points, the signals may be generated in response to movement having a speed within a predetermined range. For voice activated points, the signals may be generated in response to a predetermined volume and/or pitch of the participant's signal.

Alternately, each activation point 202 may correspond to either the sound system, water fountain system, or lighting system. That is, the activation points 202 may be configured to generate either the first, second, or third signal such that a participant can separately activate the sound system, water cannon system, and lighting system by applying a signal to different activation points 202. Activation points 202 may contain transducers for sensing the magnitude of the signal applied to the activation points. Activation points 202 may selectively generate the first, second, and/or third signals as a function of the magnitude of the signal applied to the activation point. In this manner, the participants may control which of the sound system, water cannon system, and light system are activated by controlling the magnitude of the signal applied to the activation point. For instance, a pressure sensitive activation point may generate the first signal to activate the sound system in response to sensing a force below a predetermined magnitude, while the activation point may generate the second and/or third signals in response to sensing a force above the predetermined magnitude.

In an embodiment, the sequence in which a participant signals the activation points affects the resultant sound quality of the music generated by sound system 203. For instance, the sequence in which participant signals are applied to the activation points may determine the order in which the musical notes are played by sound system 203. In an embodiment, various indications are provided to participants at predetermined times to coordinate the activation of the sound system, water cannon system, and lighting system to create a desired visual and audio display. The participants preferably apply a participant signal to an activation point immediately after receiving an indication at a predetermined time.

The indication provided to the participants may be supplied by an electrical indicator that is coupled to a control system 212. The control system preferably activates the electrical indicator at predetermined times. The indication may be a visual signal (e.g., light), an audio signal (e.g., a tone), or a tactile signal (e.g., a vibration). The indication may be located in the vicinity of the activation point. In an embodiment, a separate indicator is produced to indicate to a participant when to apply a participant signal to activation points to separately activate the sound system, lighting system, and fountain system.

Alternately, the indication may be provided by a conductor 216. As described herein, "conductor" is taken to mean any object or mechanism for coordinating the actions of the participants to create desired visual and/or sound effects by activating the sound system and/or lighting system and/or fountain system. The conductor may be an individual that motions and/or speaks to participants to signal the participants when to apply a participant signal to an activation point. The conductor may speak into a microphone, and the volume of the conductor's voice may be increased by a speaker 220 directed toward the participants. Individual speakers 220 may be located proximate each instrument or set of activation points corresponding to an instrument so that the conductor may communicate to selected participants at different times. Alternately, the conductor may be a robotic arm for directing the participants. In an embodiment, the conductor may be a projected image. For instance, different colors or images may be displayed on the screen at predetermined times, wherein each color or image corresponds to a different instrument or group of instruments. The display of a particular color or image may indicate to selected participants to apply a participant signal to selected activation points. Platform 214 preferably supports conductor 216. Platform 214 is preferably at an elevational level above the participants and activation points 202 so that the participants may easily see conductor 216.

Figure 6:
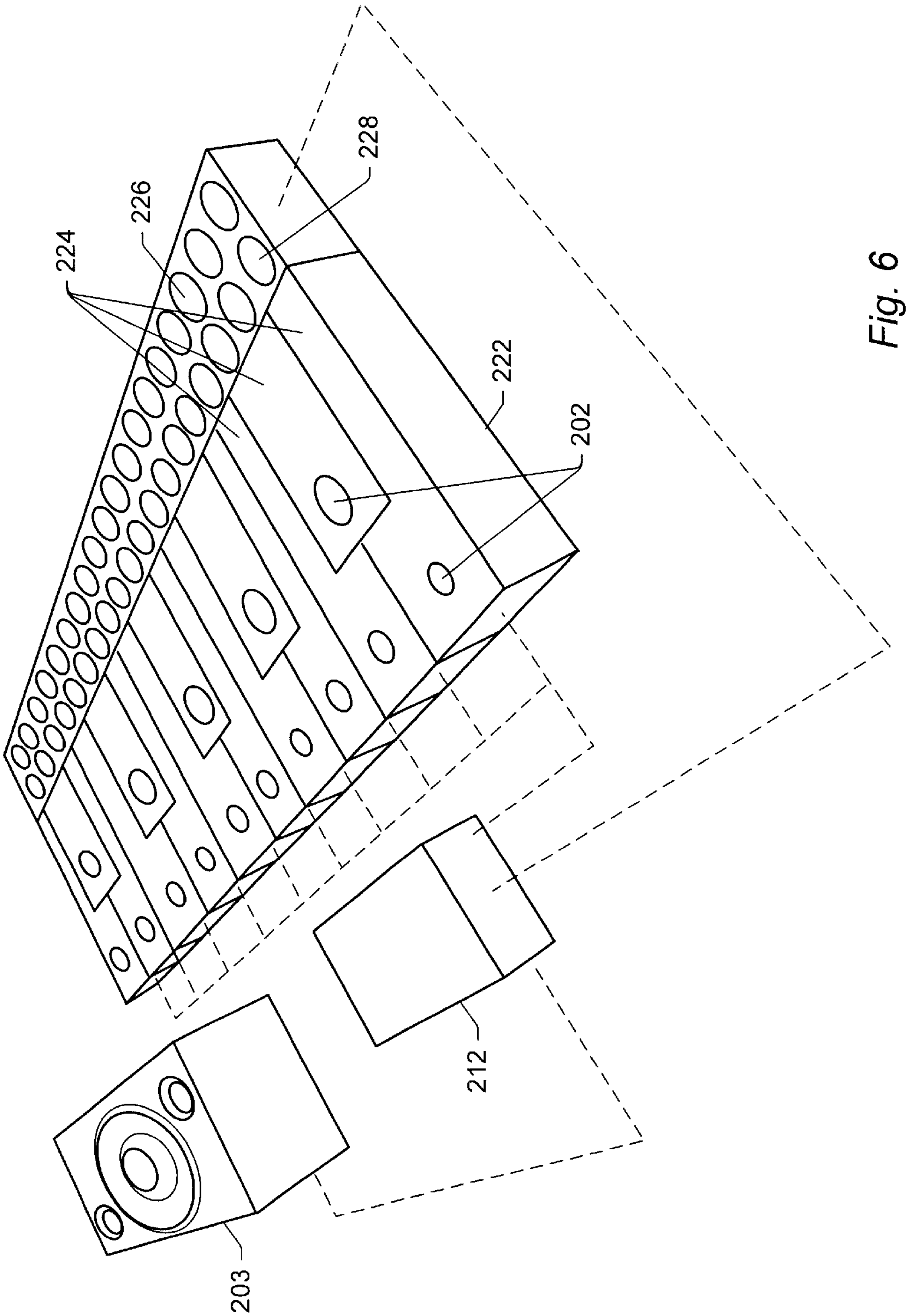
FIG. 6 is a perspective plan view of a keyboard which is an element of a sound system.
Figure 7:
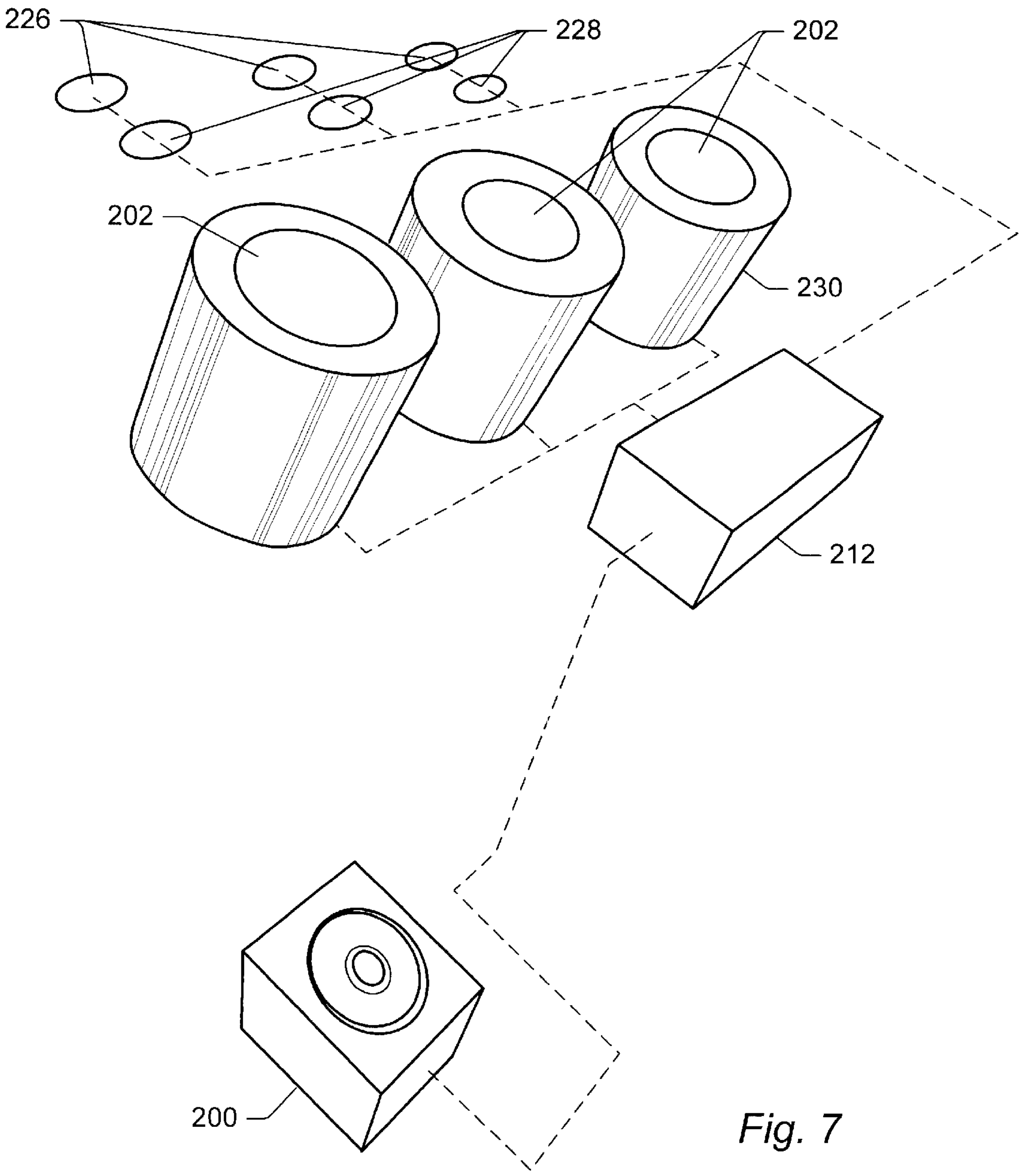
FIG. 7 is a perspective plan view of a drum set which is one element of a sound system.
Figure 8:
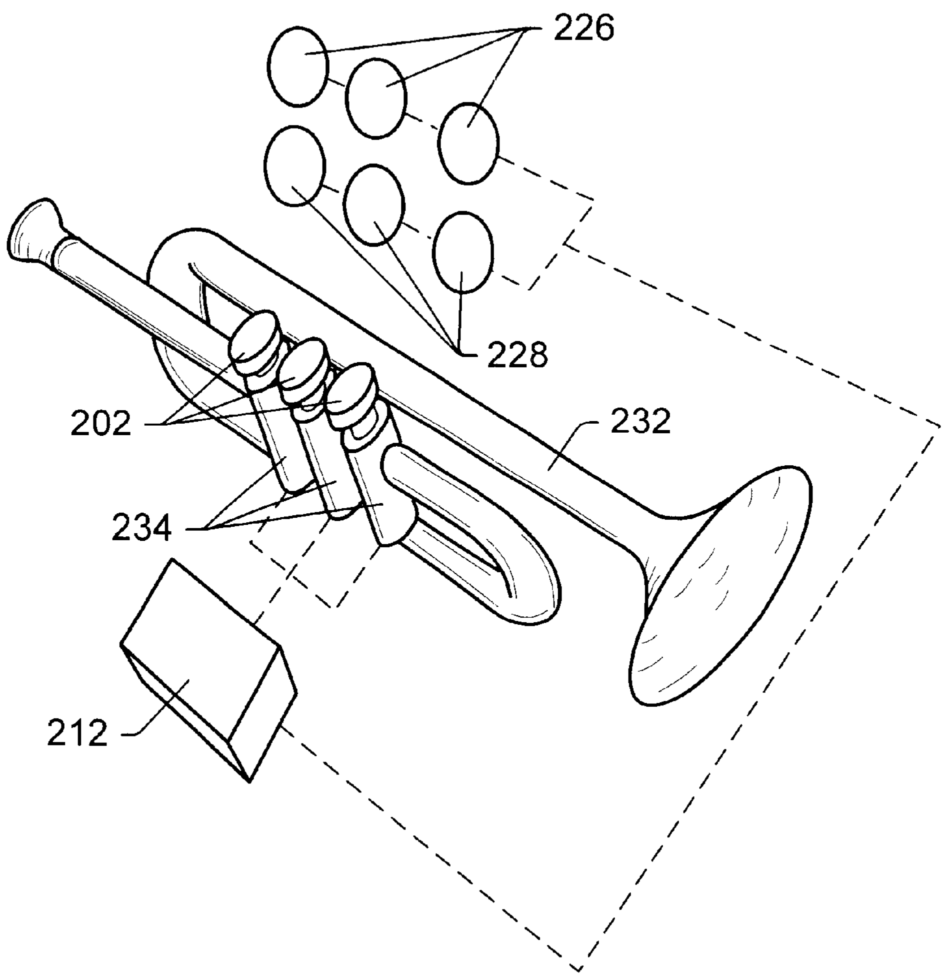
FIG. 8 is a perspective plan view of a trumpet which is one element of a sound system.
Figure 9:
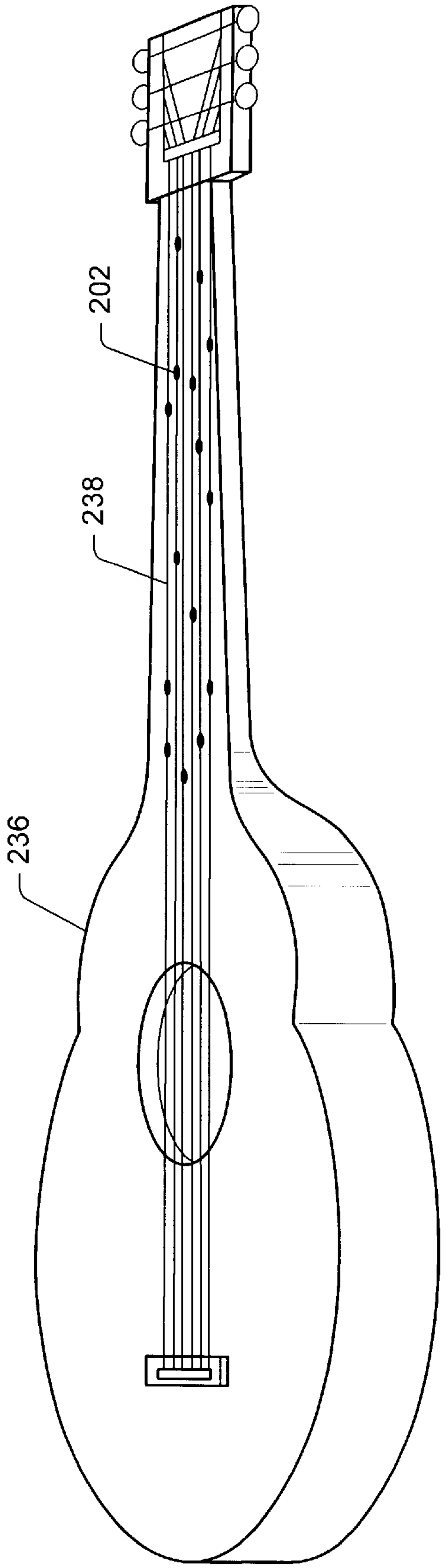
FIG. 9 is a perspective plan view of a guitar which is one element of a sound system.
Figure 10:
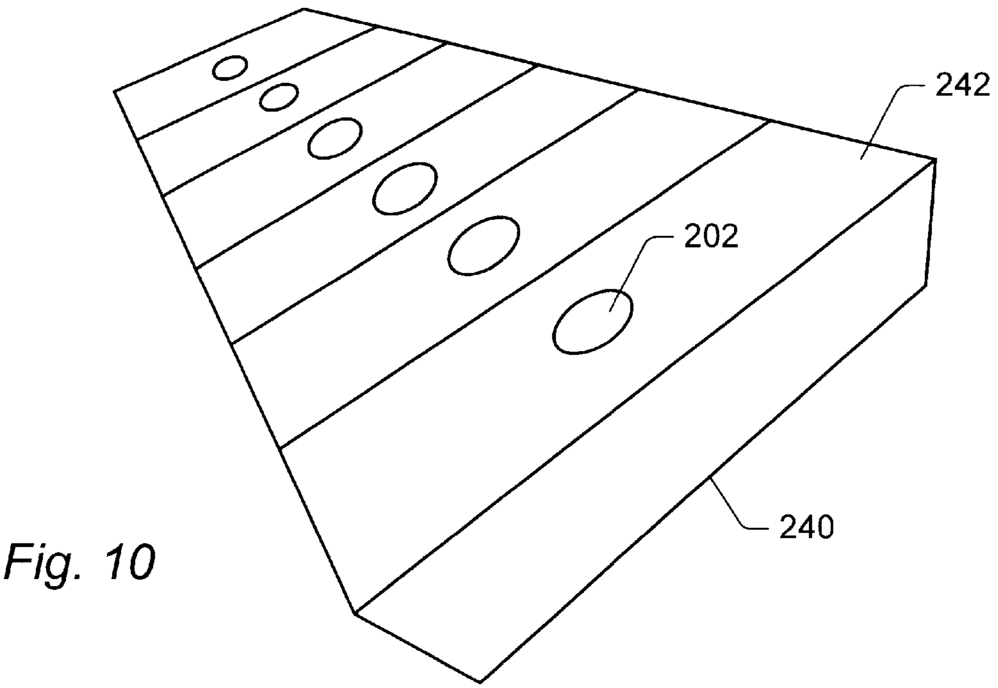
FIG. 10 is a perspective plan view of a xylophone which is one element of a sound system.

FIG. 6 illustrates one type of instrument which may belong to the "orchestra" of instruments activated by the participants. This instrument is a keyboard 222 having a plurality of keys 224. Each key 224 preferably contains an activation point 202 that is electrically coupled to control system 212. In an embodiment, keys 224 are large enough to support a participant standing thereon. In an embodiment, the weight of a participant serves as a force applied to a pressure sensitive activation point 202 to generate a participant signal. Activation point 202 preferably senses the force and generates a first signal and a second signal. Control system 212 may relay the first signal to a sound system 203 that may produce the appropriate note for the pressure point (e.g., key) contacted on keyboard 222. Control system 212 may also send the second signal to a water cannon system (not shown) to cause a water projectile to be produced. The water may be sprayed as a result of the opening of a valve in response to the second signal, as described above.

A visual indicator, for example, lights 226 and 228 may indicate when a force should and should not be applied to a certain pressure point. Lights 226 and 228 may be coupled to control system 212 which activates the lights at appropriate times. One of the lights preferably indicates when a participant should apply a force onto (e.g., stand on) one of the activation points 202 while another light preferably indicates when the participant should discontinue application of force onto the activation point. A musical note or sequence of musical notes may be played by sound system 203 in response to various participants applying forces to activation points 202. It is to be understood that lights 226 and 228 may be different colors. In one embodiment, light 226 is red and light 228 is green. In an alternate embodiment, a single light may be activated to indicate to a participant to apply a force to an activation point. The light may be one of a variety of colors, such as yellow, green, red, blue, purple, and orange. After the participant has applied force to the activation point the light may be turned off by control system 212 to indicate when the participant should discontinue applying force to the activation point.

FIGS. 7–10 depict a drum set 230, a trumpet 232 (horn), a guitar 236, and a xylophone 242, respectively. These instruments as well as other instruments may be included in the musical water fountain "orchestra". They preferably operate in a similar manner to keyboard 222 of FIG. 6. Activation points 202 may be located on each drum 230, on each playing valve 234 of trumpet 232, on each string 238 of guitar 236, and on each key 242 of xylophone 240. A participant may apply a force to an activation point by standing on it or by contacting it with a finger or hand. The activation points 202 may be in the form of a button, a lever, etc.

Figure 11:
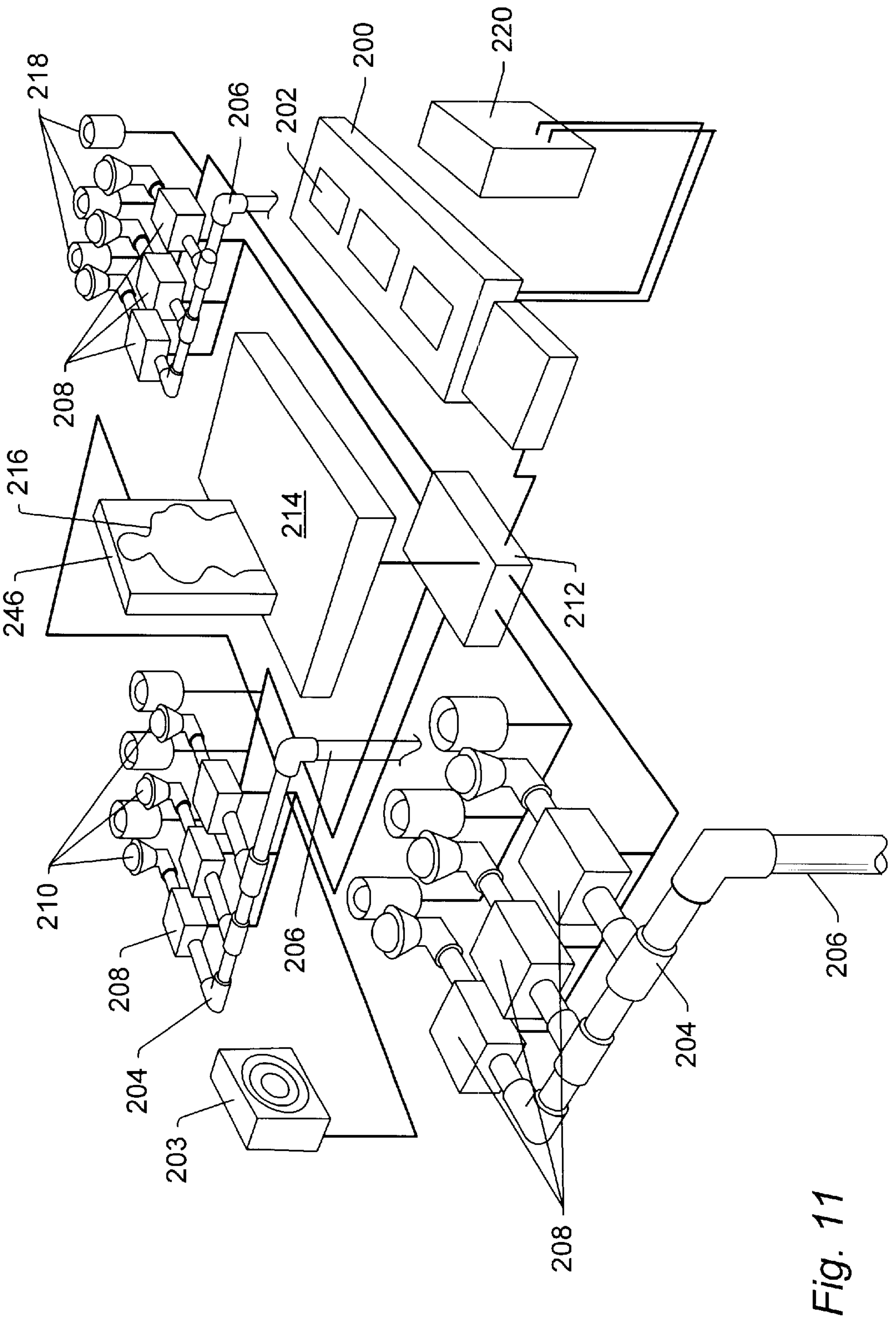
FIG. 11 is a perspective plan view of an embodiment of a musical water fountain system having a plurality of fountain systems.

FIG. 11 illustrates an embodiment of a water fountain system having a plurality of musical water fountain systems. This embodiment preferably includes the same features of the previous embodiment with some alternatives. Each fountain system preferably includes a conduit 206, valves 208, water cannons 210, and a light system 225. The water cannons are preferably also connected to a gas supply system as depicted in FIG. 5. Conductor 216 may be an image projected onto a screen 246 (television or movie screen) so that a person or robot need not be present to conduct music. Screen 246 is preferably positioned on platform 214 so that participants in the "orchestra" may see it. A participant may apply a participant signal to a particular activation point 202 in response to receiving an indication from an electrical indicator at a predetermined time. Upon sensing the force, control system 212 preferably generates signals that are relayed to sound system 203, one of the water cannons 210, and/or one of the light systems 225. In response to receiving a signal from control system 212, sound system 203 may produce a musical note, one or more of the water cannons 210 may emit a water projectile, and certain lights 225 may become activated. The lights that are activated may be in close proximity to the water cannon system from which water is being ejected. The cooperative effort of the participants at each of the individual fountains may create a pleasant musical tune and/or visual display (lights and/or water displays).

In an embodiment, control unit 212 receives the signals generated in response to the participant's signals being applied to the activation points 202. Control unit 212 then indicates to the sound system the appropriate time to play a particular note. The computer preferably controls operation of sound system 220 such that the resultant music is affected by the presence of particular first signals and the order in which such signals are relayed to control unit 212. In this manner, whether or not a participant applies a signal to an activation point 202 and the time at which a participant applies a signal to one or more activation points may affect the music produced by sound system 203. Control unit 212 may receive the participant signals from activation points 202 and delay playing of sounds by sound system 203 for a predetermined time (e.g., ten seconds or more). Alternately, sound system 203 may play a musical note substantially immediately upon receiving the first signal. In an alternate embodiment, control unit 212 may be programmed to cause a sequence of notes to be produced at a particular time so that a song is correctly played even when the participants do not contact activation points 202 at appropriate times.

In another embodiment, a single fountain system may include a plurality of different activation points for producing various sounds, lights, and/or water cannon effects. Each of the activation points may activate an instrument, or some notes of an instrument when a participant signal is applied to the activation point. A conductor may be used to signal the activation of the instruments or of specific notes of the instruments. A group of participants may respond to the conductor's indications such that a musical tune is produced.

In another embodiment, the musical fountain may be constructed in the form of a walkway. A plurality of activation points are preferably arranged on the surface of the walkway such that participants may step on the activation points. The activation points are preferably configured to respond to the weight of the participants. As the participants move along the walk way, they may contact the activation points such that a musical, light, and/or a water cannon effect is produced. For example, when a participant steps on an activation point, a portion of a song may be played by a sound system coupled to the walkway. Additionally, a water projectile may be produced as the participant walks along the walkway.

Figure 12:
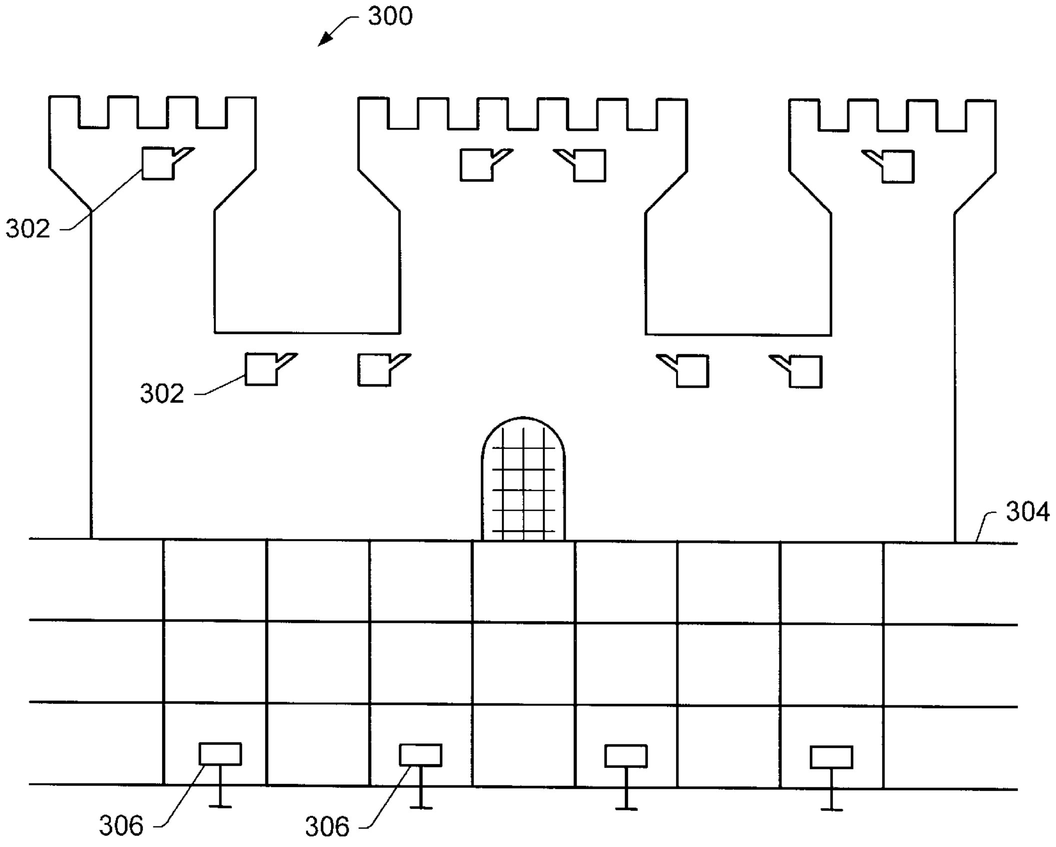
FIG. 12 is a front view of a water structure which includes a water cannon.

FIG. 12 depicts a structure 300 which has a number of water cannons associated therewith. The structure may be a castle (as depicted), a boat, a house, a fort, a space ship, etc. A number of water cannons 302 are placed about the structure. Participants may enter the structure and activate the water cannons to shoot water at people arranged upon outer grid 304. The grid may include markings which may allow the participants operating the water cannons 302 to aim the water. For example, the water cannons 302 may include a guide for allowing the participants to aim at a specific region of the grid. When a person enters the specific region of the grid, the participant may activate the water cannon causing the cannon to project water onto the person. Alternatively, the structure may be configured to hold only the water cannons 302. Activation points, 306 may be remotely coupled to the water cannons. The activation points are preferably configured to produce a signal to cause the water cannon to fire a projectile of water in response to a participant signal. The activation point may activate one or more of the water cannons 302 causing a projectile of water to be sent onto the grid 304. The activation points 306 may also allow the water cannon to be remotely aimed at a specific grid. The participant may therefore "aim" the cannon at a specific region of the grid using the activation device and, subsequently, create a signal causing the water cannon to fire a projectile at the grid.

While the devices and methods of this invention have been described in terms of preferred embodiments, it will be apparent to those of skill in the art that variations may be applied to the devices, methods and in the steps or in the sequence of steps of the methods described herein without departing from the concept, spirit and scope of the invention. All such similar substitutions and modifications apparent to those skilled in the art are deemed to be within the spirit, scope and concept of the invention as defined by the appended claims.

What is claimed is:

1. A water amusement device, comprising:

a first hollow member comprising a closed end and an opposite end having an opening therein;

a second hollow member comprising first and second opposing open ends, wherein the second hollow member is of smaller diameter than the first hollow member, and wherein, during use, the second hollow member is disposed in the opening in the first hollow member to form an airtight seal within the opening, such that the second open end is inside the first hollow member;

a partition member with an opening therein, wherein, during use, the partition member is disposed inside the first hollow member and the second hollow member is disposed in the opening in the partition member, such that the partition member is slidable along at least a portion of the second hollow member, and further wherein the partition member substantially forms a partition from the exterior surface of the second hollow member to the interior surface of the first hollow member;

one or more fluid inlets configured to release fluid into the first hollow member during use;

one or more gas inlets configured to release a gas into the first hollow member during use, and wherein the partition member is disposed between a gas inlet and the closed end of the first hollow member during use; and a control mechanism in communication with a gas inlet, the control mechanism being configured to control a flow of gas to the gas inlet.

2. The amusement device of claim 1, wherein the first end of the second hollow member is disposed outside the first hollow member during use.

3. The amusement device of claim 1, wherein the partition member comprises one or more openings in addition to the opening that contains the second hollow member.

4. The amusement device of claim 1, wherein the partition member has a substantially planar shape.

5. The amusement device of claim 1, wherein the control mechanism is an electronic switch, a manual switch, a lever, a handle, a wheel, a pedal, a pressure pad, a button, or a trigger.

6. The amusement device of claim 1, wherein the first hollow member is a cylinder.

7. The amusement device of claim 1, wherein the first hollow member has a cross-sectional shape of a circle, a star, a square, a regular polyhedron, a trapezoid, an ellipse or a figure eight.

8. The amusement device of claim 1, wherein the first hollow member comprises a sight for aiming the cannon.

9. The amusement device of claim 1, further comprising a fluid source connected to a fluid inlet.

10. The amusement device of claim 9, wherein the fluid source is a water source and the device is configured to eject a projectile of water.

11. The amusement device of claim 1, further comprising one or more gas release valves configured to release gas from the first hollow member.

12. The amusement device of claim 11, wherein a gas release valve is configured such that the gas release valve is open when the first hollow member is empty of fluid, and the gas release valve is closed when the fluid reaches a predetermined level in the first hollow member during use.

13. The amusement device of claim 1, wherein a gas inlet is connected to a source of pressurized gas.

14. The amusement device of claim 13, wherein the pressurized gas is compressed air.

15. The amusement device of claim 1, wherein the diameter of the second hollow member is about one-third the diameter of the first hollow member.

16. The amusement device of claim 1, wherein the diameter of the second hollow member is from about one-fifth to about three-fifths the diameter of the first hollow member.

17. The amusement device of claim 1, wherein the diameter of the second hollow member is from about one-fifth to about two-fifths the diameter of the first hollow member.

18. The amusement device of claim 1, wherein a fluid inlet comprises a valve configured to control release of fluid into the first hollow member.

19. The amusement device of claim 18, wherein the valve is configured such that the valve is open when the first hollow member is empty of fluid, and the valve is closed when the fluid reaches a predetermined level in the first hollow member during use.

20. The amusement device of claim 1, further comprising a control system and an activation point, the control system being coupled to the control mechanism and the activation point being coupled to the control system, wherein the activation point is configured for detecting a participant signal and further configured to generate a control signal and send the control signal to the control system during use, and wherein the control system is configured to activate the control mechanism in response to a signal from the activation point, such that a gas flows to the gas inlet.

21. A water cannon comprising:

an elongated reservoir comprising an opening in one end thereof;

an elongated channel member comprising first and second open ends, wherein the channel member forms an airtight seal within the opening in one end of the reservoir during use, such that the first open end is outside the reservoir or coplanar with an edge of the reservoir and the second open end is inside the reservoir;

a plunger member of the same size and shape as a cross-section of the interior of the reservoir such that the plunger member forms a slidable partition in the interior surface of the reservoir during use, and wherein the plunger member provides an opening therein configured to accept the channel member and form a slidable engagement with the channel member during use;

one or more fluid inlets connected to release fluid into the reservoir during use;

one or more gas inlets connected to release a gas into the reservoir during use, and wherein the plunger member is disposed between a gas inlet and the second open end of the channel member during use; and a control mechanism in communication with a gas inlet, the control mechanism being configured to control a flow of gas to the gas inlet.

22. A method of operating a water amusement device, comprising:

providing a water cannon comprising:

a first hollow member comprising a closed end and an opposite end having an opening therein;

a second hollow member comprising first and second opposing open ends, wherein the second hollow member is of smaller diameter than the first hollow member, and wherein, during use, the second hollow member is disposed in the opening in the first hollow member to form an airtight seal within the opening, such that the first open end is outside the first hollow member, or coplanar with an end of the first hollow member, and the second open end is inside the first hollow member;

a partition member with an opening therein, wherein, during use, the partition member is disposed inside the first hollow member and the second hollow member is disposed in the opening in the partition member, such that the partition member is slidable along at least of portion of the second hollow member, and further wherein the partition member substantially forms a partition from the exterior surface of the second hollow member to the interior surface of the first hollow member;

one or more fluid inlets connected to a fluid source and configured to release fluid into the first hollow member during use;

one or more gas inlets connected to a source of pressurized gas, and configured to release a gas into the first hollow member during use, and wherein the partition member is disposed between a gas inlet and the closed end of the first hollow member during use; and a control mechanism in communication with a gas inlet, the control mechanism being configured to control a flow of gas to the gas inlet;

opening the fluid inlet effective to substantially fill the first hollow member with fluid;

activating the control mechanism effective to release a burst of gas into the first hollow member, thereby ejecting a projectile of water from the first opening in the second hollow member.

23. A method of manufacturing a water cannon comprising:

providing a first hollow member comprising a closed end and an opposite end having an opening therein;

providing a second hollow member comprising first and second opposing open ends, wherein the second hollow member is of smaller diameter than the first hollow member, and wherein, during use, the second hollow member is disposed in the opening in the first hollow member to form an airtight seal within the opening, such that the second open end is inside the first hollow member;

providing a partition member with an opening therein, wherein, during use, the partition member is disposed inside the first hollow member and the second hollow member is disposed in the opening in the partition member, such that the partition member is slidable along at least of portion of the second hollow member, and further wherein the partition member substantially forms a partition from the exterior surface of the second hollow member to the interior surface of the first hollow member;

providing one or more fluid inlets configured to release fluid into the first hollow member during use;

providing one or more gas inlets configured to release a gas into the first hollow member during use, and wherein the partition member is disposed between a gas inlet and the closed end of the first hollow member during use; and providing a control mechanism in communication with a gas inlet, the control mechanism being configured to control a flow of gas to the gas inlet.

* * * * *

UNITED STATES PATENT AND TRADEMARK OFFICE

CERTIFICATE OF CORRECTION

PATENT NO. : 6,533,191 B1
DATED : March 18, 2003
INVENTOR(S) : Berger et al.

It is certified that error appears in the above-identified patent and that said Letters Patent is hereby corrected as shown below:

Column 18,
Line 21, please delete “at least of portion” and substitute therefor -- “at least a portion” --.
Line 61, please delete “at least of portion” and substitute therefor -- “at least a portion” --.

Signed and Sealed this

Fifteenth Day of July, 2003

JAMES E. ROGAN
*Director of the United States Patent and Trademark Office*